United States Patent
Muramatsu et al.

(10) Patent No.: US 6,752,170 B2
(45) Date of Patent: Jun. 22, 2004

(54) FUEL PRESSURE REGULATING VALVE

(75) Inventors: Toshihiko Muramatsu, Chiryu (JP);
Takashi Furukawa, Nisshin (JP);
Shinji Takase, Oyama (JP)

(73) Assignees: Denso Corporation; Kyosandenki Co., Ltd. (JP)

(*) Notice: Subject to any disclaimer, the term of this patent is extended or adjusted under 35 U.S.C. 154(b) by 109 days.

(21) Appl. No.: 10/045,168

(22) Filed: Jan. 15, 2002

(65) Prior Publication Data

US 2002/0092565 A1 Jul. 18, 2002

(30) Foreign Application Priority Data

Jan. 16, 2001 (JP) ........................................ 2001-007405
Apr. 20, 2001 (JP) ........................................ 2001-122925
Sep. 14, 2001 (JP) ........................................ 2001-280348

(51) Int. Cl.[7] ............................................. F16K 3/365
(52) U.S. Cl. ...................... 137/510; 251/118; 123/459
(58) Field of Search ........................ 137/510, 601.18; 251/118; 123/459

(56) References Cited

U.S. PATENT DOCUMENTS

| | | | | |
|---|---|---|---|---|
| 2,756,936 A | * | 7/1956 | Mueller et al. ............. | 137/510 |
| 4,543,935 A | * | 10/1985 | Tuckey ........................ | 137/510 |
| 4,633,901 A | * | 1/1987 | Brandt et al. ............... | 137/510 |
| 5,020,568 A | * | 6/1991 | Taylor ......................... | 137/316 |
| 5,065,725 A | * | 11/1991 | Spoetter ..................... | 123/463 |
| 5,161,572 A | | 11/1992 | Oberl et al. ........... | 134/516.27 |
| 5,429,094 A | * | 7/1995 | Akiba et al. ................ | 137/510 |
| 5,558,063 A | * | 9/1996 | Minagawa et al. ......... | 123/457 |
| 5,967,177 A | | 10/1999 | Bueser ........................ | 137/510 |

FOREIGN PATENT DOCUMENTS

| | | |
|---|---|---|
| DE | 39 37 707 | 5/1991 |
| EP | 0 698 838 B1 | 8/1995 |
| EP | 0 698 838 A1 | 8/1995 |
| JP | 11-501388 | 2/1999 |
| JP | 2000-104642 | 4/2000 |

* cited by examiner

*Primary Examiner*—S Hepperle
(74) *Attorney, Agent, or Firm*—Nixon & Vanderhye PC (57) ABSTRACT

There is disclosed a pressure regulating valve which effectively reduces a noise of a fuel pressure regulating valve without relation to a flow amount of a fuel. In this valve, a flow collision preventing member (35) is fitted to an upper end opening portion of a bush (26), and an upper portion of the flow collision preventing member (35) is protruded to a side of a valve body (33) rather than a valve seat (28) (an upper end surface of the bush (26)). A plurality of flow passages (36) for flowing the fuel in an axial direction thereof (in a downward direction) along an inner peripheral surface of the bush (26) are formed in an outer peripheral portion of the flow collision preventing member (35) with a uniform interval. A runoff recess portion (37) running off a protruding portion of the flow collision preventing member (35) is formed in the valve body (33) positioned immediately above the valve seat (28). Since the upper portion of the flow collision preventing member (35) protrudes out to an inner peripheral side of an annular gap formed between the valve body (33) and the valve seat (28), a collision of a flow of the fuel flowing through respective portions of the annular gap toward the inner peripheral direction is prevented by the flow collision preventing member 35, a pressure pulsation due to the collision of the flow of the fuel is not generated in a lower side of the valve body 33, and a noise due to the pressure pulsation is reduced.

6 Claims, 10 Drawing Sheets

A-A CROSS SECTIONAL VIEW

FUEL PRESSURE REGULATING VALVE

BACKGROUND OF THE INVENTION

1. Field of the Invention

The present invention relates to a fuel pressure regulating valve provided with a means for reducing a noise.

2. Description of the Related Art

In a motor car in recent years, a quiet property becomes important, and in accordance with a progress of the quiet property, a noise generated in the fuel pressure regulating valve generates a problem as a new noise source.

Figure 17:
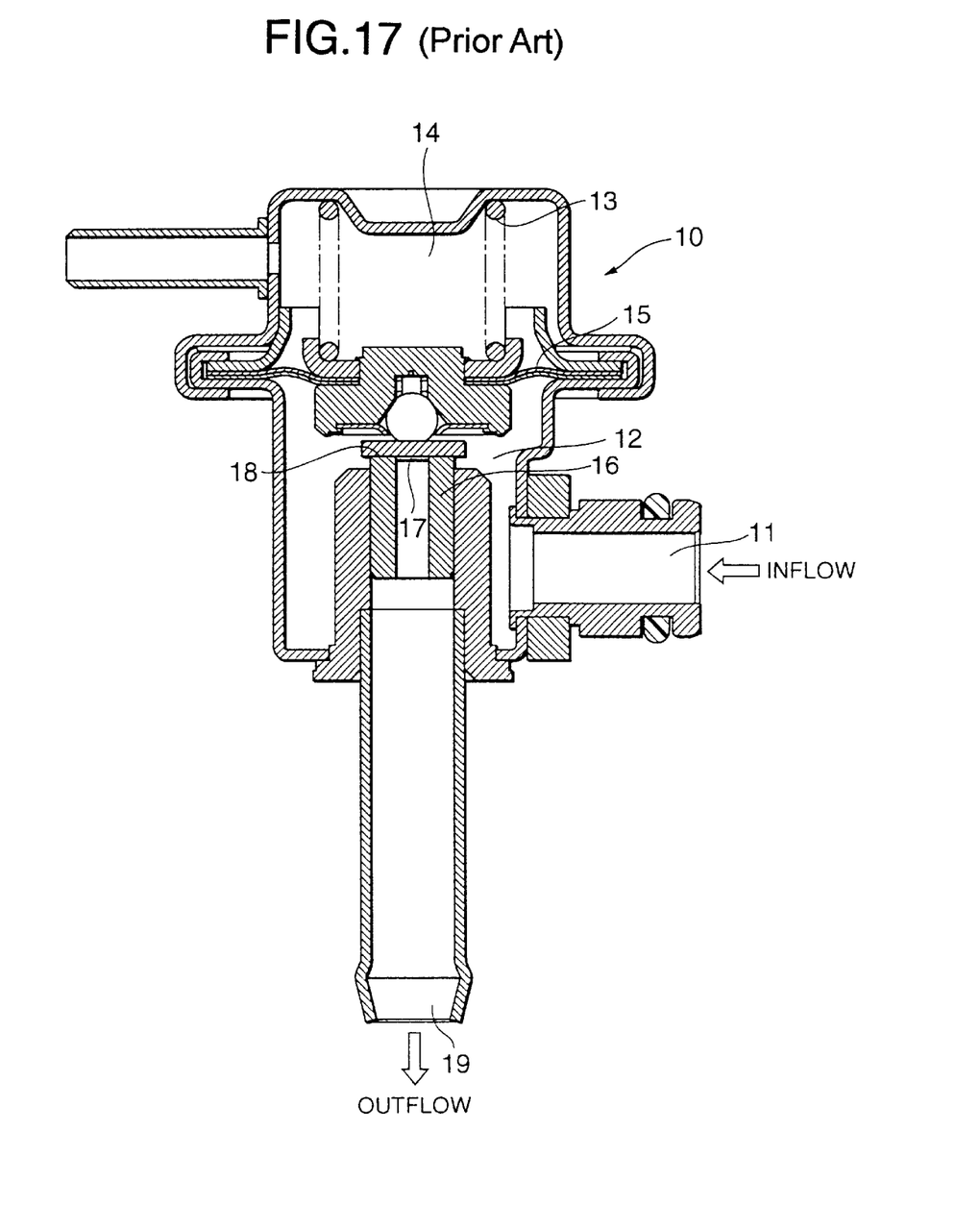
FIG. 17 is a vertical cross sectional view of a conventional fuel pressure regulating valve.

A conventional fuel pressure regulating valve is generally structured, as shown in FIG. 17, such that a fuel chamber 12 into which a fuel discharged from a fuel pump flows from an inlet port 11 and a spring chamber 14 receiving a spring 13 are formed within a housing 10 so as to be separated by a diaphragm 15, a tubular bush 16 flowing out the fuel within the fuel chamber 12 is provided, a valve body 17 mounted to the diaphragm 15 is opposed to a valve seat 18 formed in a peripheral edge of an opening portion of the bush 16, and the valve body 17 is energized in a direction of the valve seat 18 (in a valve closing direction) by the spring 13.

The fuel pressure regulating valve is structured such that when a force in a valve opening direction due to a fuel pressure within the fuel chamber 12 and a force (a set pressure) in the valve closing direction generated by the spring 13 are applied to the valve body 17 (the diaphragm 15), and the force in the valve opening direction due to the fuel pressure within the fuel chamber 12 becomes greater than the force in the valve closing direction generated by the spring 13, the valve body 17 is pressed up in the valve opening direction due to the fuel pressure to a position at which both of the forces balance. Accordingly, an annular gap is formed between the valve body 17 and the valve seat 18, and the fuel within the fuel chamber 12 flows toward a central direction of the opening portion of the bush 16 from respective portions in the annular gap so as to be returned within a fuel tank from a outflow port 19 in the housing 10.

In the conventional fuel pressure regulating valve mentioned above, since the fuel within the fuel chamber 12 flows with great force toward the central direction of the opening portion in the bush 16 from the respective portions in the annular gap formed between the valve body 17 and the valve seat 18, the fuel flowing with great force from the respective portions in the annular gap collides in the center portion of the opening portion in the bush 16, a pressure in the collision portion increases so as to become a positive pressure, and the positive pressure is applied to a center portion on a lower surface of the valve body 17. Further, near an inner peripheral surface of the opening portion in the bush 16, since the fuel flows with great force toward the center direction of the opening portion in the bush 16, a peel-off of the fuel flow is generated so as to generate a negative pressure, and the negative pressure is applied to the lower surface of the valve body 17.

Since during driving an engine, a fuel consumption varies every second in correspondence to a driving state, a lift amount of the valve body 17 (a gap size between the valve body 17 and the valve seat 18) varies every second in correspondence thereto, and a flow amount of the fuel flowing from the gap between the valve body 17 and the valve seat 18 toward the central direction of the opening portion in the bush 16 varies every second, the positive pressure and the negative pressure which are generated near the lower surface of the valve body 17 pulsate, and there occurs a phenomenon that the valve body 17 and the diaphragm 15 vibrate due to a pressure pulsation. Accordingly, the spring 13 resonates so as to generate the noise, and the vibration of the fuel pressure regulating valve is transmitted to a fuel pipe and a fuel tank so as to resonate them, thereby increasing the noise.

Further, there is a case that the noise is generated due to the pulsation resonation with respect to the equipment arranged in a downstream side of the outflow port 19.

That is, a pressure distribution of the fuel in the opening portion of the bush is structured such that the center portion has the positive pressure and the portion near the inner peripheral surface has the negative pressure as mentioned above. That is, the pressure distribution is uneven. When the fuel having the uneven pressure distribution flows into the equipment arranged in the downstream side of the outflow port 19, for example, a jet pump, a fuel pipe and the like, these equipment vibrate due to an influence of the pressure distribution. As a result, the pulsation resonance is generated between the equipment and the fuel pressure regulating valve, and the noise is also generated due to this noise.

In this case, a fuel pressure regulating valve for reducing the noise mentioned above is introduced in Japanese National Publication of Translated Version No. 11-501388. The fuel pressure regulating valve is provided with a step having a diameter reduced toward a downstream side, in an inner peripheral side of a bush. That is, a large diameter portion and a small diameter portion are respectively arranged in an upstream side and a downstream side on the boundary of the step. Then, the sound is reduced by making sized such as a diameter, a cross sectional area, a length and the like in the large diameter portion and the small diameter portion proper, in other words, making a throttling amount of the flow in the small diameter portion proper.

However, the size of the fuel pressure regulating valve in the publication is set on the assumption that a flow amount of a fuel passing through an inner portion of the bush exists within a specified range. The flow amount of the fuel passing through the inner portion of the bush varies every second in correspondence to a drive condition or the like. Accordingly, the fuel pressure regulating valve in the publication mentioned above is effective in the case that the fuel flow amount exists within the specific range, however, it is difficult to say that the fuel pressure regulating valve is effective in every fuel flow amount.

Further, at a time when the fuel flows into the bush from a gap between a valve body and a valve seat at a high speed, there is a case that there occurs a so-called reduced pressure boiling in which a negative pressure area appears due to a flow speed difference and a bubble cell nucleus is generated within the fuel. The generated bubble cell nucleus expands in the negative pressure area within the bush so as to be burst. A pressure wave generated due to the burst plays a role in generating the noise.

In this case, a fuel pressure control valve for reducing the noise due to the reduced pressure boiling is introduced in Japanese Unexamined Patent Publication No. 12-104642. The fuel pressure regulating valve is structured such that an introduction port communicated with a fuel tank is pierced in a return pipe connected to a downstream side of a bush. In this fuel pressure regulating valve, generation of a negative pressure area is restricted by introducing an ambient atmosphere within the fuel tank which is under a substantially atmospheric pressure, from the introduction port. Then, the burst of the bubble cell nucleus generated due to the reduced pressure boiling is restricted and the noise is reduced.

However, the fuel pressure regulating valve in the publication mentioned above achieves its effect only after being connected to the return pipe. That is, unless the fuel pressure regulating valve is connected to the return pipe, it is impossible to reduce the noise.

SUMMARY OF THE INVENTION

The present invention is made by taking the matters mentioned above into consideration, and an object of the present invention is to provide a fuel pressure regulating valve which can effectively reduce a noise without relation to a flow amount of a fuel.

In order to achieve the object mentioned above, a fuel pressure regulating valve in accordance with the present invention is structured such that a flow collision preventing means for preventing a collision of a flow of a fuel flowing from respective portions in an annular gap formed between a valve body and a valve seat toward a central direction of an opening portion of a bush is provided in the bush. In accordance with this structure, since the collision of the fuel of the fuel flowing from the respective portions in the annular gap formed between the valve body and the valve seat toward the central direction of the opening portion of the bush is prevented by the flow collision preventing means, a positive pressure area generated by the collision of the flow of the fuel is not generated. Accordingly, a pulsation pressure of the positive pressure is not applied to a lower surface of the valve body, a phenomenon that the valve body and a diaphragm vibrate is restricted, and it is possible to reduce a noise due to a resonance of a spring introduced by a vibration transmission and a noise due to a resonance of a fuel pipe and a fuel tank.

In this case, the flow collision preventing means may be integrally formed with the bush, however, it is preferable that the structure is made such that a flow collision preventing means independently formed from the bush is fitted to the opening portion of the bush, a part of the flow collision preventing means is protruded to a side of the valve body rather than the valve seat, and a runoff recess portion running off a protruding portion of the flow collision preventing means is formed in the valve body. In accordance with this structure, a shape of the bush may be the same as the conventional one, and it is not necessary to change a design of the shape of the bush. Further, it is possible to improve an accuracy of concentricity between the flow collision preventing means and the bush by an engagement between the both, it is further possible to avoid an interference and a collision between the valve body and the flow collision preventing means by the runoff recess portion formed in the valve body, and it is possible to closely attach the valve body to the valve seat of the bush in a secure manner.

Further, the structure may be made such that a flow passage or a hole for flowing the fuel flowing from the annular gap formed between the valve body and the valve seat in an axial direction along an inner peripheral surface of the bush is formed in the flow collision preventing means. In accordance with the structure mentioned above, since it is possible to flow the fuel in the axial direction along the inner peripheral surface of the bush while preventing the collision of the flow of the fuel within the bush, it is possible to reduce a peel-off of the flow of the fuel near the inner peripheral surface of the bush so as to reduce the negative pressure due to the peel-off of the flow of the fuel, it is possible to restrict the vibration due to the pulsation of the negative pressure, and it is possible to further increase the noise reduction effect.

Alternatively, the structure may be made such that a flow passage or a hole for flowing the fuel within the bush in a swirling manner is formed in the flow collision preventing means. In accordance with the structure mentioned above, it is possible to reduce the pee peel-off of the flow of the fuel near the inner peripheral surface of the bush by swirling the fuel within the bush so as to reduce the negative pressure due to the peel-off of the flow of the fuel, and it is possible to further increase the noise reduction effect.

Further, in place of the provision of the flow collision preventing means, the structure may be made such that a partition wall portion provided with a flow passage or a hole for communicating the fuel chamber with an external portion is provided in the bush. In this case, the partition wall portion is structured such as to partition the flow of the fuel in a diametrical direction or an axial direction. Further, the flow passage or the hole is structured such as to extend through the partition wall portion so as to pass the fuel therethrough. In accordance with the present structure, it is possible to regulate a pressure and a flow speed of the fuel in the downstream of the partition wall portion by the partition wall portion and the flow passage or the hole. Further, it is possible to restrict the vibration of the fuel pressure regulating valve, the equipment in the downstream side of the bush and the like.

In this case, a place of arrangement of the partition wall portion within the bush is not particularly limited. For example, a cup-like partition wall portion protruding to the side of the valve body may be arranged in the opening portion of the bush. In this case, the flow of the fuel is partitioned in the diametrical direction. Further, the partition wall portion may be arranged within the bush just like a dam. In this case, the flow of the fuel is partitioned in the axial direction. In this case, the partition wall portion may be integrally provided with the bush. Further, the partition wall portion may be separately provided from the bush and fitted to the bush later.

In this case, the structure may be made such that the partition wall portion is a pressure partition wall portion separating a low pressure area within the bush from a high pressure area in the side of the valve body.

In the case of arranging the partition wall portion in the bush, there are a case that (1) the collision position of the fuel is set to an upstream side of the partition wall portion, and a case that (2) the collision position of the fuel is set to a downstream side of the partition wall portion.

The present structure is particularly effective in the case (2) mentioned above. In accordance with the structure, even if the positive pressure area due to the collision of the fuel or the negative pressure area due to the peel-off of the flow is generated in the downstream side of the pressure partition wall portion, that is, within the bush (in the low pressure area), an application of the pressure pulsation to the valve body is shut off by the pressure partition wall portion. Accordingly, a phenomenon that the valve body and the diaphragm vibrate is restricted, and it is possible to reduce a noise due to a resonance of a spring introduced by a vibration transmission and a noise due to a resonance of the fuel pipe and the fuel tank.

Further, in the structure using the pressure partition wall portion mentioned above, the flow passage or the hole formed in the pressure partition wall portion may be formed in a shape for flowing the fuel within the low pressure area (within the bush) in a swirling manner. In accordance with the structure mentioned above, it is possible to reduce the peel-off of the flow of the fuel near the inner peripheral surface of the bush so as to restrict the generation of the negative pressure area by swirling the fuel within the bush while preventing the flow of the fuel within the bush from being collided so as to prevent the positive pressure area from being generated, whereby it is possible to further increase the noise reduction effect.

In this case, the shape of the flow passage or the hole is not particularly limited as far as it is possible to flow the fuel within the bush in the swirling manner.

For example, in the case of arranging the cup-like pressure partition wall portion protruding to the side of the valve body in the opening portion of the bush, the structure may be made such that a flow passage or a hole extending through a side peripheral wall of the pressure partition wall portion at a predetermined angle with respect to a tangential direction is arranged. As mentioned above, the fuel collides in the center portion of the opening portion in the bush. In accordance with the present structure, the flow of the fuel is rectified in a spiral shape or a vortex shape by the flow passage or the hole. Accordingly, it is possible to restrict the collision of the fuel in the center portion.

Further, the pressure partition wall portion in accordance with the present structure is arranged in the center portion of the opening portion of the bush. Accordingly, the side peripheral wall of the pressure partition wall portion just functions so as to dam the flow of the fuel in the central direction. It is also possible to restrict the collision of the fuel by this side peripheral wall.

Further, for example, in the case of arranging the pressure partition wall portion like the dam within the bush, the structure may be made such that a flow passage or a hole extending through both surfaces in an axial direction of the pressure partition wall portion at a predetermined angle with respect to the axial direction is arranged. In accordance with the present structure, the flow of the fuel is rectified in a spiral shape by the flow passage or the hole. Accordingly, it is possible to restrict the collision of the fuel in the center portion.

Further, the structure may be made such that the partition wall portion is a pressure uniformizing partition wall portion provided with a plurality of flow passages or holes extending through both axial end surfaces in an axial direction and uniformizing a pressure distribution of the fuel in the downstream side.

That is, the present structure is provided with the pressure uniformizing partition wall portion in which a plurality of flow passages or holes extending through the bush in the axial direction are arranged.

As mentioned above, in the case of arranging the partition wall portion in the bush, there are the case that (1) the collision position of the fuel exists in the upstream side of the partition wall portion, and the case that (2) the collision position of the fuel exists in the downstream side of the partition wall portion.

The present structure is particularly effective in the case (1) mentioned above. That is, when the collision of the fuel is generated in the upstream side, the pressure distribution of the fuel becomes uneven. In particular, the pressure in the bush center portion is high, and the pressure near the inner peripheral surface of the bush is low.

In this case, a plurality of flow passages or holes extending therethrough in the axial direction are arranged in the pressure uniformizing partition wall portion of the present structure. Further, the flow of the fuel is throttled by these flow passages or holes. Accordingly, the fuel flowing along the center portion having a large flow speed, that is, a great flow amount per unit time can not pass through the flow passage or the hole arranged in the center portion of the pressure uniformizing partition wall portion while maintaining the flow amount. Accordingly, a part of the fuel flowing along the center portion is dammed by the pressure uniformizing partition wall portion. On the contrary, the fuel flowing near the inner peripheral surface having a small flow amount can pass through the flow passage or the hole arranged near the inner peripheral surface of the bush of the pressure uniformizing partition wall portion while maintaining the flow amount. In this case, the flow passage or the hole near the inner peripheral surface of the bush has a surplus in a flow amount yet. Accordingly, the dammed fuel in the center portion flows into the flow passage or the hole near the inner peripheral surface.

In accordance with a dividing effect of the pressure uniformizing partition wall portion mentioned above, a pressure distribution of the fuel is uniformized in the downstream side of the pressure uniformizing partition wall portion. Further, due to a throttle loss generated by the hole, the flow speed of the fuel is reduced. Accordingly, it is possible to restrict the vibration of the equipment arranged in the downstream side of the bush. Further, due to the uniformization of the pressure distribution, the negative pressure area is hard to appear in the downstream side of the pressure uniformizing partition wall portion. Accordingly, it is possible to restrict an expansion of the bubble cell nucleus due to the pressure reduction boiling.

In this case, the pressure uniformizing partition wall portion just has to be arranged in the upstream side of the equipment arranged in the downstream side. Accordingly, it is possible to arrange in every places within the bush. In this case, in preferable, in the structure using the pressure uniformizing partition wall portion, the structure may be made such that the pressure uniformizing partition wall portion is arranged apart from the valve seat in the axial direction. That is, the present structure corresponds to a structure in which the pressure uniformizing partition wall portion is arranged within the bush so as to be depressed from the valve seat.

The valve seat has a role in sealing the flow of the fuel at a time when the valve body sits. Accordingly, a severe dimensional accuracy is required in the valve seat. In this case, when the pressure uniformizing partition wall is arranged at the same height as that of the valve seat, that is, in a flush manner, the valve body also sits on the pressure uniformizing partition wall portion. Accordingly, a severe dimensional accuracy is also required in the pressure uniformizing partition wall portion. In accordance with the present structure, the pressure uniformizing partition wall portion is arranged so as to be depressed from the valve seat. Accordingly, a severe dimensional accuracy is not required in the pressure uniformizing partition wall portion. Accordingly, it is possible to produce the pressure uniformizing partition wall portion, and the fuel pressure regulating valve by extension in a simpler manner.

Further, in more preferable, the structure may be made such that at a time of moving the pressure uniformizing partition wall portion from the valve seat in the axial direction, the pressure uniformizing partition wall portion is arranged immediately below the valve seat in the axial direction. The fuel flows within the bush from the gap between the valve body and the valve seat. At this time, the fuel is throttled in accordance with a throttling effect applied by the gap between the valve body and the valve seat so as to have a high pressure. Further, in accordance with moving apart from the gap between the valve body and the valve seat, the throttled fuel is again expanded. In this case, when arranging the pressure uniformizing partition wall portion apart from the valve seat, the expanded fuel is again throttled by the flow passage or the hole. Then, a resistance due to this throttling plays a role in vibrating the diaphragm to which the valve body is mounted.

In this point, in accordance with the present structure, the pressure uniformizing partition wall portion is arranged immediately below the valve seat in the axial direction. Accordingly, the fuel throttled in accordance with the throttling effect applied by the gap between the valve body and the valve seat flows into the flow passage or the hole in a state as it is without expanding. Therefore, it is possible to restrict not only the vibration of the equipment arranged in the downstream side of the bush but also the vibration of the diaphragm arranged in the upstream side of the bush.

Further, in further preferable, the structure may be made such that the pressure uniformizing partition wall portion is arranged so that an end surface in an upstream side in an axial direction is apart from the valve seat to a downstream side in the axial direction at an amount equal to or more than 0.1 mm and less than 0.7 mm. That is, this structure corresponds to a structure in which the pressure uniformizing partition wall portion is arranged so that the end surface in the upstream side among both end surfaces in the axial direction of the pressure uniformizing partition wall portion exists at the downstream side position apart from the valve seat at the amount equal to or more than 0.1 mm and less than 0.7 mm.

In this case, the position of the upstream side end surface is set to be equal to or more than 0.1 mm from valve seat because of the following reason. That is, there is a case that a fine foreign matter is mixed in the fuel flowing from the gap between the valve body and the valve seat. Further, there is a case that the foreign matter stays on a surface of the upstream side end surface of the pressure uniformizing partition wall portion. At this time, when the upstream side end surface is excessively close to the valve seat, the foreign matter staying on the surface is brought into contact with the valve body at a time of closing the valve, whereby there is a risk that a sealing property is reduced. Accordingly, when arranging the upstream side end surface apart from the valve seat at an amount equal to or more than 0.1 mm, the foreign matter is not brought into contact with the valve body at a time of closing the valve even if the foreign matter stays on the surface. For the reason mentioned above, in accordance with the present structure, the upstream end surface is arranged apart from the valve seat in the axial direction at an amount equal to or more than 0.1 mm.

Further, the position of the upstream side end surface is set to be less than 0.7 mm from the valve seat because of the following reason. That is, as mentioned above, at first, the fuel is throttled by passing through the gap between the valve body and the valve seat, next expands in accordance with flowing downward from the valve seat, and is again throttled by the flow passage or the hole in the pressure uniformizing partition wall portion. Accordingly, when flowing the fuel after expansion into the pressure uniformizing partition wall portion, there is a risk that the pulsation is generated due to the throttle resistance of the flow passage or the hole. In this case, the expansion of the fuel becomes significant at a time of flowing downward at an amount equal to or more than 0.7 mm from the valve seat. Accordingly, when flowing the fuel into the pressure uniformizing partition wall portion from the valve seat without flowing downward at an amount equal to or more than 0.7 mm, it is possible to effectively restrict the generation of the pulsation. In accordance with the reason mentioned above, in the present structure, the upstream end surface is arranged apart from the valve seat in the axial direction at an amount less than 0.7 mm.

DETAILED DESCRIPTION OF EMBODIMENTS OF THE INVENTION

<Embodiment 1>

A description will be given below of an embodiment 1 in accordance with the present invention with reference to FIGS. 1 to 4.

Figure 1:
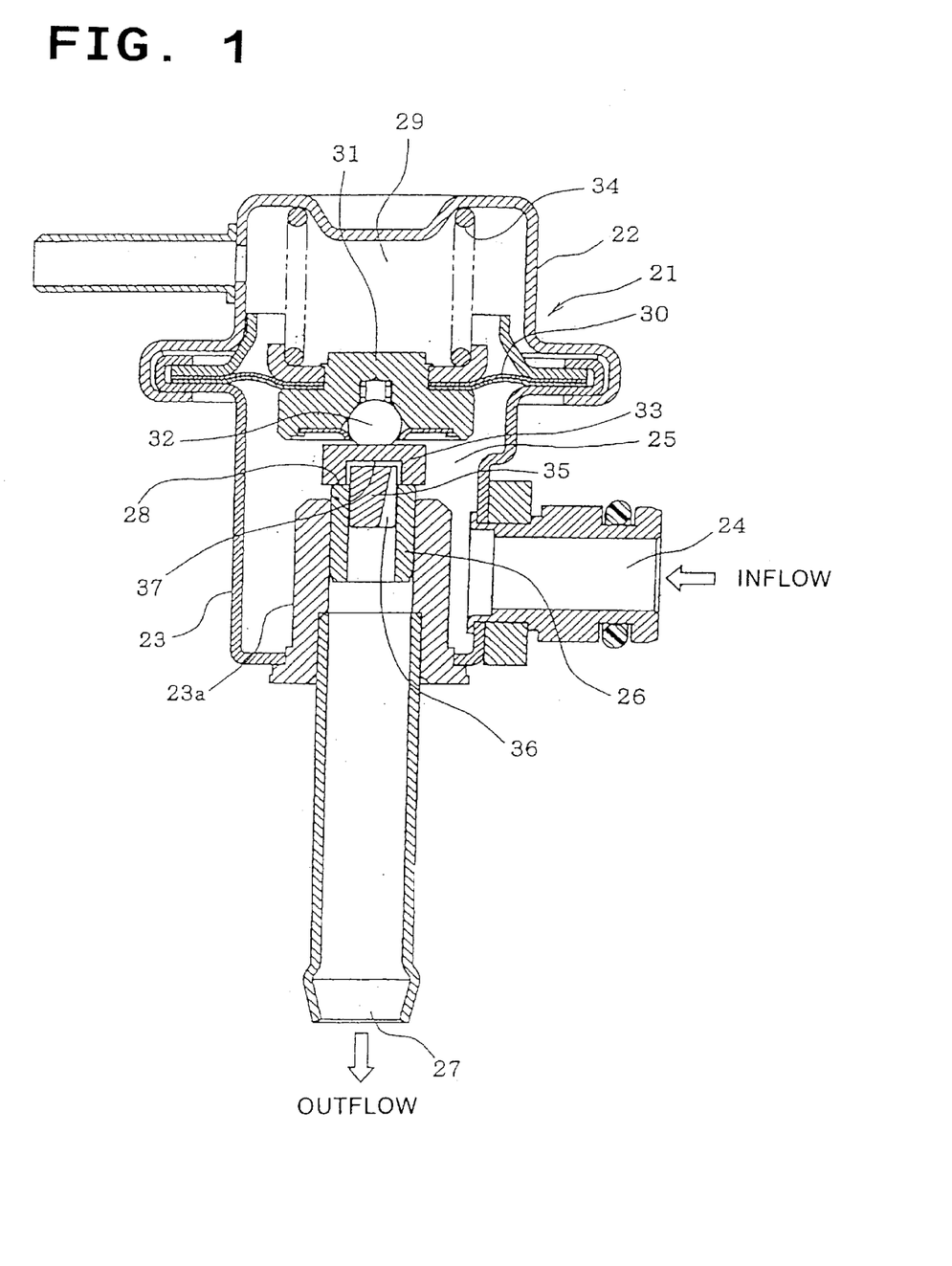
FIG. 1 is a vertical cross sectional view of a fuel pressure regulating valve showing an embodiment 1 in accordance with the present invention.

As shown in FIG. 1, a housing 21 of a fuel pressure regulating valve is constructed by connecting an upper housing 22 to a lower housing 23 in accordance with a caulking operation or the like, and a fuel chamber 25 into which a fuel discharged from a fuel pump (not shown) flows from an inflow port 24 is formed within the lower housing 23. A cylindrical bush 26 is fitted and fixed within a small diameter tube portion 23a provided in a lower portion of the lower housing 23 in a vertical direction, and an outflow port 27 is provided in a lower portion of the small diameter tube portion 23a. A valve seat 28 is formed on an upper end surface (a peripheral edge of an opening portion) of the bush 26.

On the contrary, a spring chamber 29 is formed within the upper housing 22, and the spring chamber 29 and the fuel chamber 25 are partitioned by a diaphragm 30. A valve body holder 31 is fixed to a center portion of the diaphragm 30 in accordance with a caulking operation or the like, and a valve body 33 is held in a lower side of the valve body holder 31 via a spherical body 32 for aligning so as to face to the valve seat 28 in the peripheral edge of the opening portion in the upper end of the bush 26. Further, the valve body 33 is energized in a direction of the valve seat 28 (in a valve closing direction) by a spring 34 received within the spring chamber 29.

Figure 2:
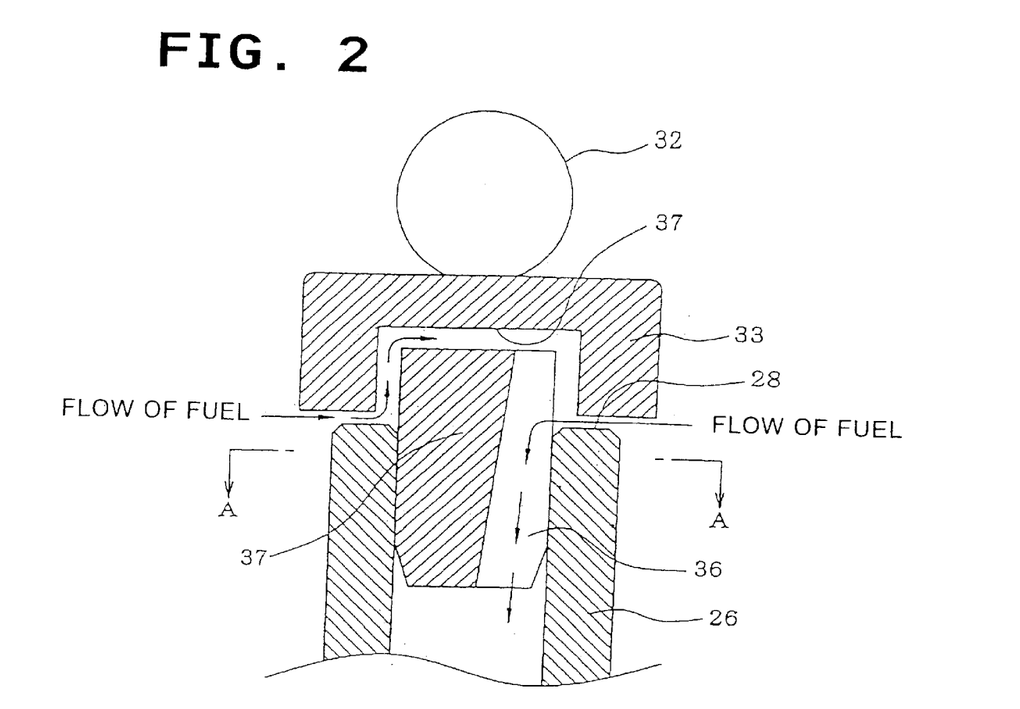
FIG. 2 is an enlarged vertical cross sectional view of a main portion of the embodiment 1.
Figure 3:
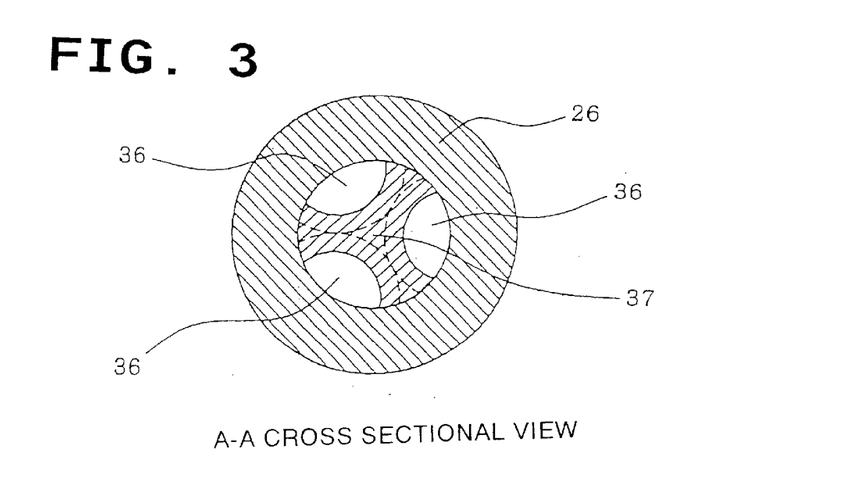
FIG. 3 is an enlarged horizontal cross sectional view of a main portion showing along a line A—A in FIG. 2.

As shown in FIGS. 2 and 3, a flow collision preventing member 35 (a flow collision preventing member) is fitted to the opening portion of the upper end in the bush 26 in accordance with a pressure insertion, a welding operation or the like, and an upper portion of the flow collision preventing member 35 protrudes to a side of the valve body 33 rather than the valve seat 28 (the upper end surface of the bush 26). The flow collision preventing member 35 is formed by a cylindrical metal material, and a plurality of (for example, three) flow passages 36 (or holes) for flowing the fuel in an axial direction thereof (downward) along an inner peripheral surface of the bush 26 are formed in an outer peripheral portion thereof with a uniform interval. The respective flow passages 36 are structured such that cross sections of the flow passages are formed in a circular arc shape and the cross sections of the flow passages are increased little by little as going to a downward side.

On the contrary, a runoff recess portion 37 running off the protruding portion of the flow collision preventing member 35 is formed in the valve body 33. The runoff recess portion 37 is formed in a little larger size with taking an error in assembly or an error in size into consideration so that the valve body 33 does not interfere or collide with the flow collision preventing member 35.

In the fuel pressure regulating valve structured in the manner mentioned above, when a force in a valve opening direction given by the fuel pressure within the fuel chamber 25 and a force (a set pressure) in a valve closing direction given by the spring 34 are applied to the valve body 33 (the diaphragm 30), and the force in the valve opening direction given by the fuel pressure within the fuel chamber 25 becomes greater than the force in the valve closing direction given by the spring 34, the valve body 33 is pressed up in the valve opening direction by the fuel pressure to a position at which both of the forces balance. Accordingly, as shown in FIG. 2, an annular gap is formed between the valve body 33 and the valve seat 28, and the fuel within the fuel chamber 12 flows from respective portions in the annular gap toward an inner diameter direction.

In accordance with the present embodiment 1, since the upper portion of the flow collision preventing member protrudes to the inner peripheral side of the annular gap formed between the valve body 33 and the valve seat 28, the collision of the flow of the fuel flowing toward in the inner peripheral direction along the respective portions of the annular gap is prevented by the flow collision preventing member 35, the positive pressure area due to the collision of the flow of the fuel is not generated in the lower side of the valve body 33. Accordingly, a pulsation pressure of the positive pressure is not applied to the lower surface of the valve body 33, a phenomenon that the valve body 33 and the diaphragm 30 vibrate is restricted, and it is possible to reduce a noise due to a resonance of the spring 29 introduced by a vibration transmission and a noise due to a resonance of the fuel pipe and the fuel tank.

Further, in accordance with the present embodiment 1, since the flow passage 36 for flowing the fuel flowing in from the annular gap formed between the valve body 33 and the valve seat 28 in the axial direction (downward) along the inner peripheral surface of the bush 26 is formed in the flow collision preventing member 35, it is possible to flow the fuel in the axial direction (downward) along the inner peripheral surface of the bush 26 while preventing the flow of the fuel from being collided within the bush 26. Accordingly, it is possible to reduce a peel-off of the flow of the fuel near the inner peripheral surface of the bush 26, it is possible to reduce the negative pressure due to the peel-off of the flow of the fuel, it is possible to restrict the vibration due to the pulsation of the negative pressure, and it is possible to further increase a noise reduction effect.

Figure 4:
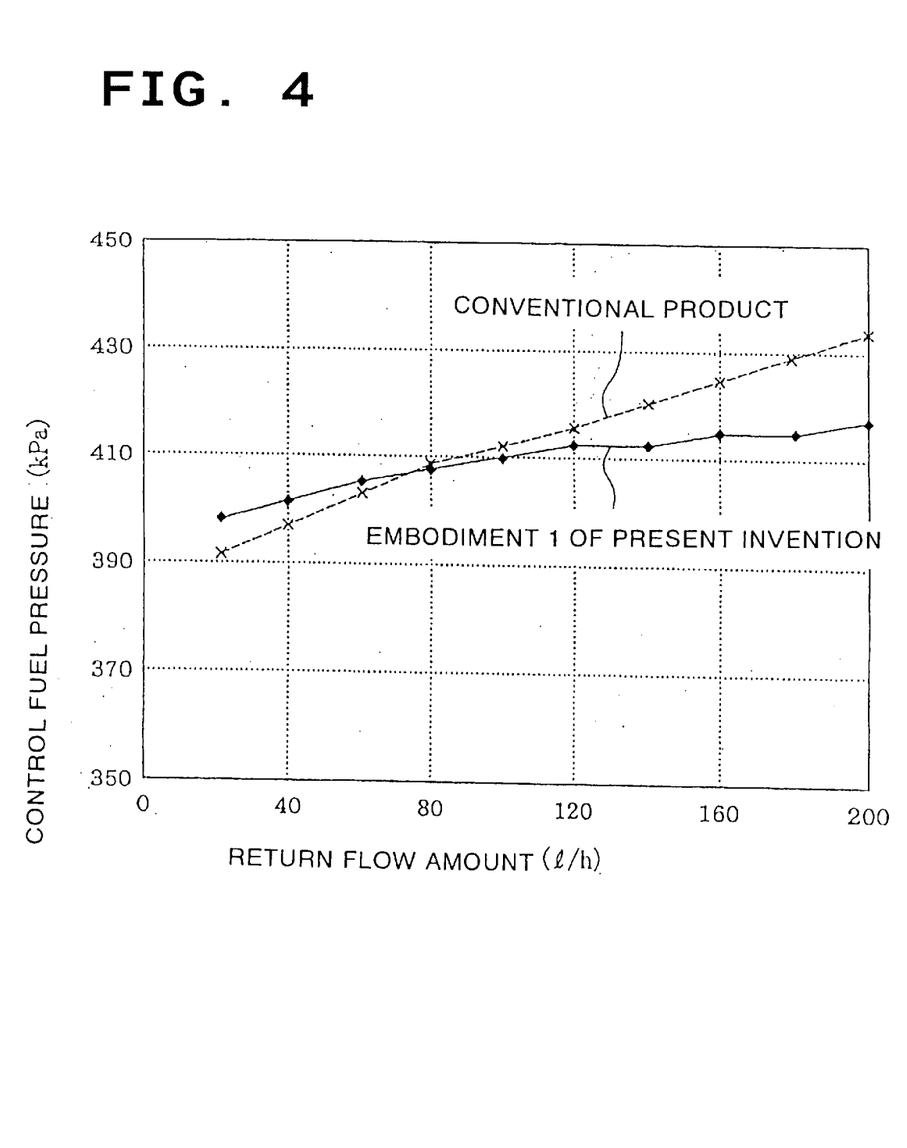
FIG. 4 is a view showing a characteristic of a control fuel pressure with respect to a return flow amount.
Figure 8:
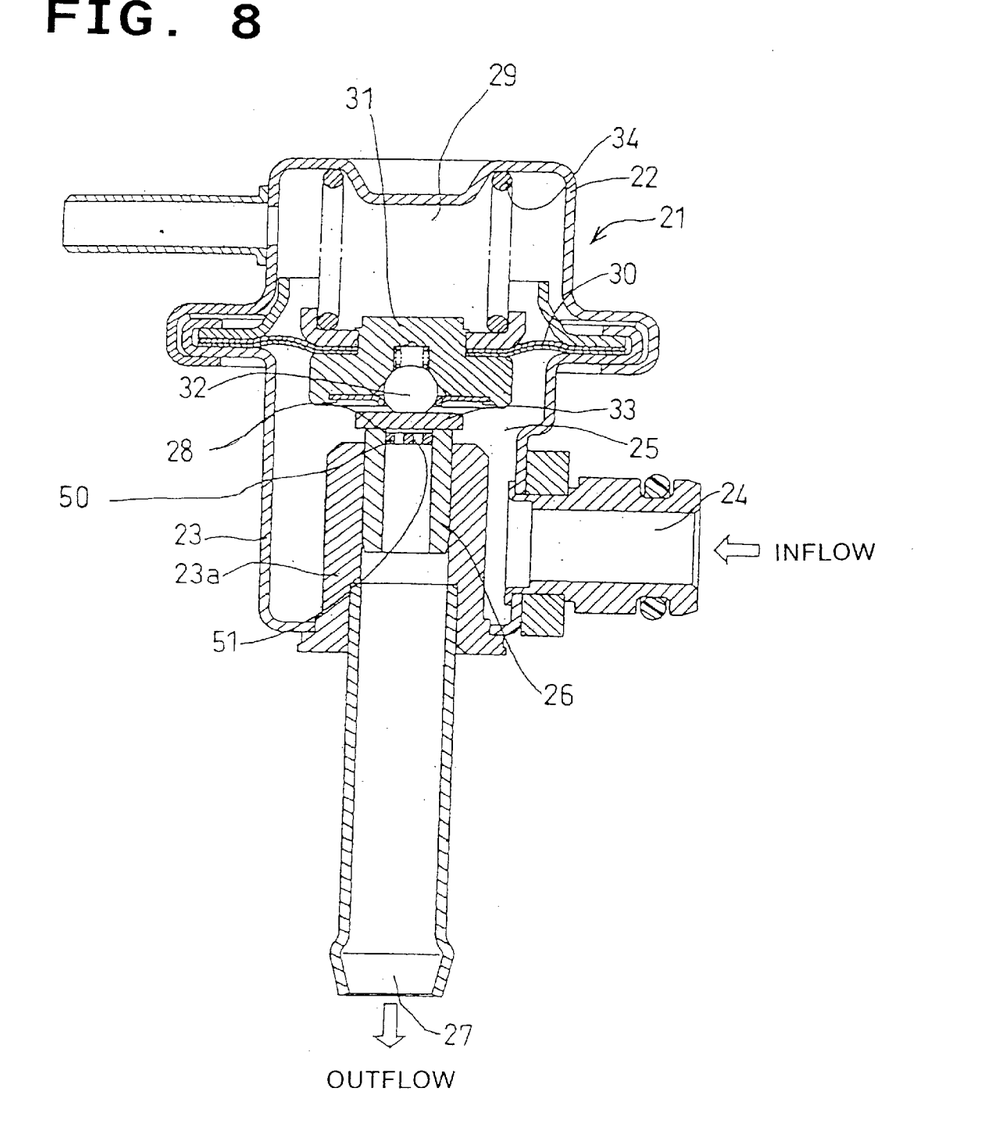
FIG. 8 is a vertical cross sectional view of a fuel pressure regulating valve showing an embodiment 3 in accordance with the present invention.

In this case, the conventional fuel pressure regulating valve shown in FIG. 8 has a property that the control fuel pressure (the supply fuel pressure to the fuel injection valve) becomes high in accordance that a return flow amount (a flow amount flowing out from the outflow port 27) is increased, as shown by a dotted line in FIG. 4. Accordingly, the control fuel pressure changes on the basis of the return flow amount, and it is hard to keep the control fuel pressure constant. In general, since the fuel injection amount is controlled on the assumption that the control fuel pressure is constant, the fuel injection amount changes if the control fuel pressure changes in correspondence to the change of the return fuel amount, so that there is generated a problem that an air-fuel ratio moves apart from a target air-fuel ratio.

On the contrary, in accordance with the present embodiment 1, since the flow collision preventing member 35 fitted to the upper end opening portion of the bush 26 plays a roll in reducing a turbulence of the flow (the collision or the peel-off of the flow) of the fuel within the bush 26, a change of the control fuel pressure with respect to the return flow amount is reduced as shown by a solid line in FIG. 4, so that it is possible to stabilize the fuel pressure control property and it is possible to improve the fuel injection control accuracy (an air-fuel ratio control accuracy).

In this case, the portion corresponding to the flow collision preventing member 35 (the flow collision preventing means) may be integrally formed with the bush 26, however, as in the present embodiment 1, in the case that the structure is made such that the flow collision preventing member 35 separately formed from the bush 26 is fitted to the opening portion of the bush 26, the shape of the bush 26 may be formed in the same shape as the conventional one, and it is not necessary to change a design of the shape of the bush 26. Further, it is possible to improve an accuracy of concentricity between the flow collision preventing member 35 and the bush 26 by an engagement between the both.

Further, in accordance with the present embodiment 1, the flow passage 36 is formed in the axial direction (in the downward direction) in the outer peripheral portion of the flow collision preventing member 35, however, the structure may be made such that the flow passage 36 is inclined at a predetermined angle with respect to the axial direction (the downward direction) so as to flow the fuel within the bush 26 from the flow passage 36 in a swirling manner. In accordance with this structure, it is possible to reduce the peel-off of the flow of the fuel near the inner peripheral surface of the bush 26 by swirling the fuel within the bush 26 while preventing the collision of the flow of the fuel within the bush 26, whereby it is possible to reduce the negative pressure due to the peel-off of the flow of the fuel and it is possible to increase the noise reduction effect.

<Embodiment 2>

Figure 5:
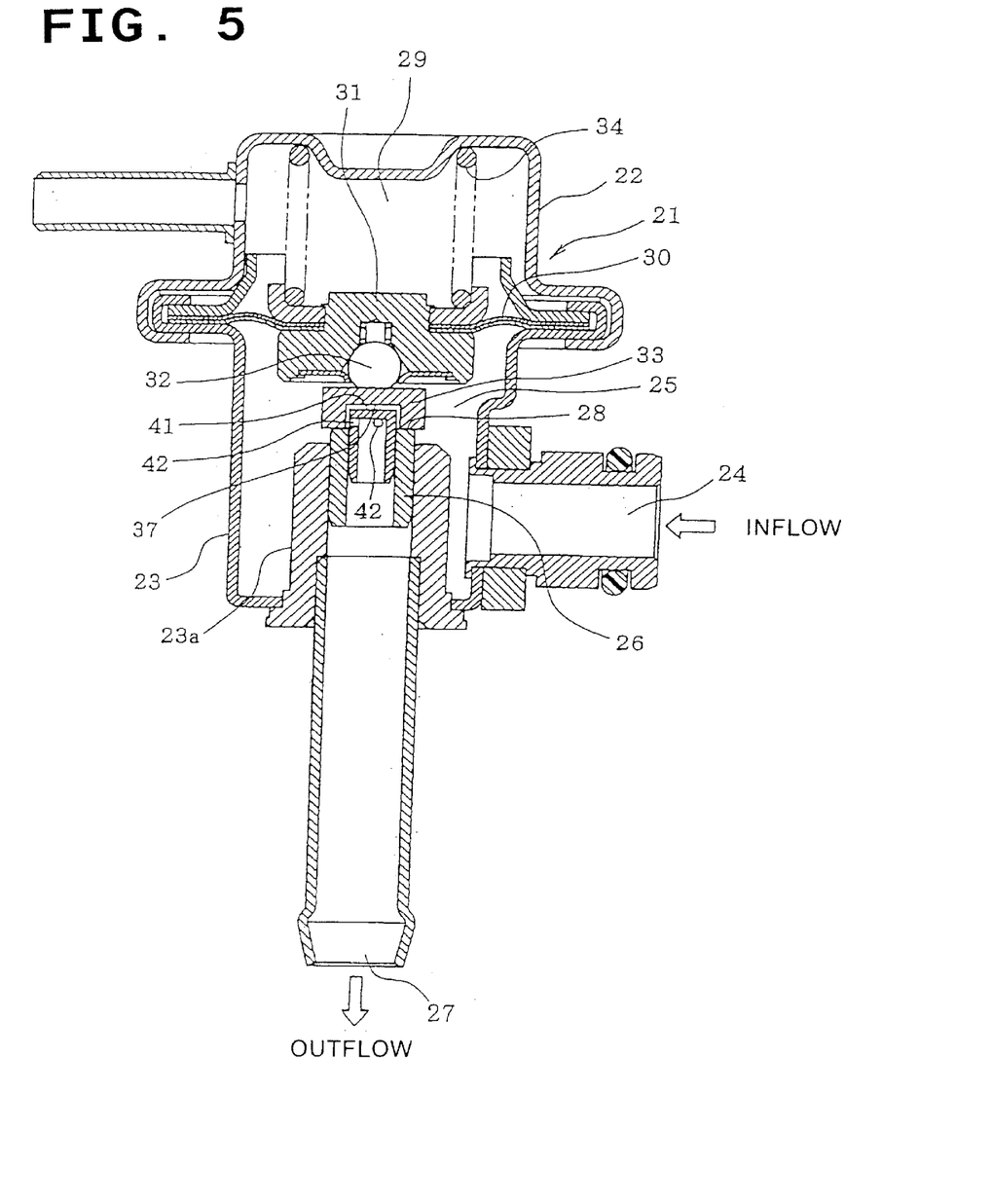
FIG. 5 is a vertical cross sectional view of a fuel pressure regulating valve showing an embodiment 2 in accordance with the present invention.
Figure 6:
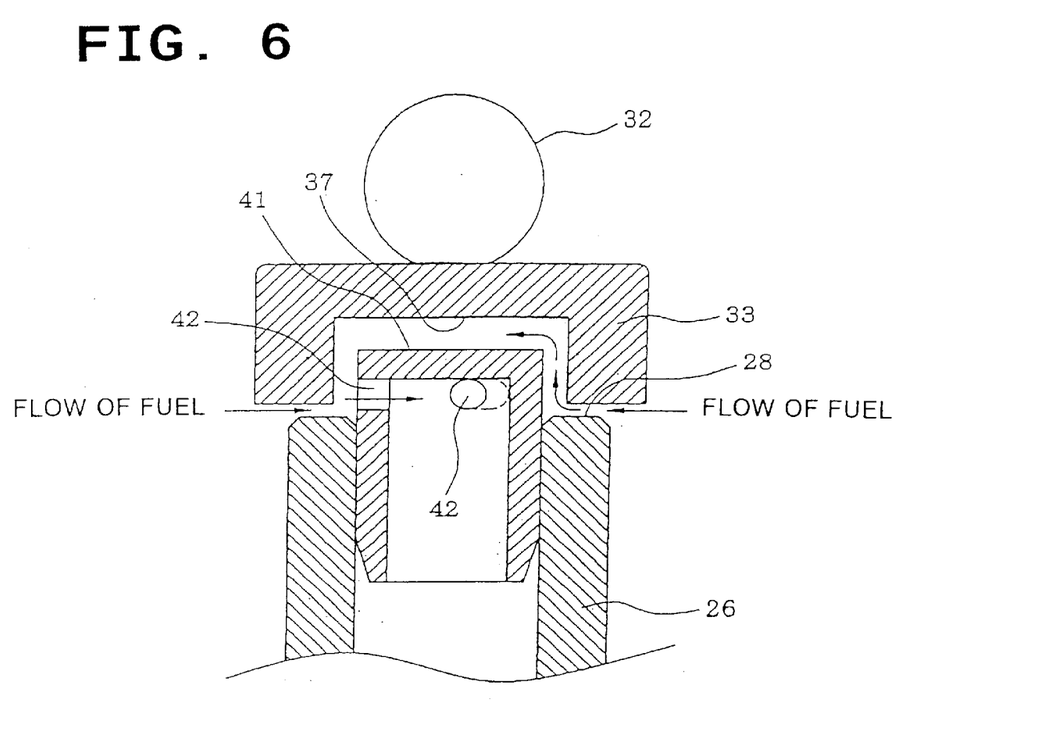
FIG. 6 is an enlarged vertical cross sectional view of a main portion of the embodiment 2.

Next, a description will be given of an embodiment 2 in accordance with the present invention with reference to FIGS. 5 to 7. In accordance with the present embodiment 2, in place of the flow collision preventing member 35, a pressure partition wall portion 41 is fitted to an upper end opening portion of the bush 26 in accordance with a pressure insertion, a welding operation or the like, and an upper portion of the pressure partition wall portion 41 protrudes out to a side of the valve body 33 rather than the valve seat 28 (the upper end surface of the bush 26). The pressure partition wall portion 41 is formed in a cylindrical cup shape having a closed upper end surface, and a plurality of (for example, three) inflow holes 42 (or flow passages) are formed in the upper end portion of the pressure partition wall portion 41 with a uniform interval.

Figure 7:
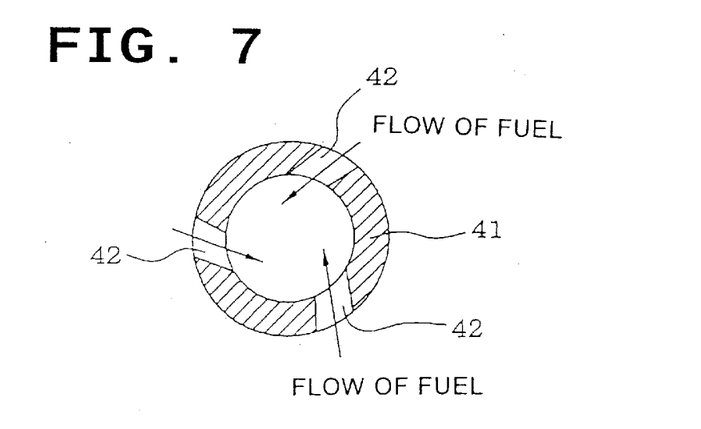
FIG. 7 is an enlarged horizontal cross sectional view of a pressure partition wall portion.

As shown in FIG. 7, each of the inflow holes 42 in the pressure partition wall portion 41 is formed so as to be inclined at a predetermined angle with respect to an inner diameter direction of the pressure partition wall portion 41 and is structured such that the fuel flowing from each of the inflow holes 42 swirls along the inner peripheral surface of the pressure partition wall portion 41. Each of the inflow holes 42 of the pressure partition wall portion 41 protrudes to the side of the valve body 33 rather than the valve seat 28 (the upper end surface of the bush 26), and each of the inflow holes 42 is positioned in the inner peripheral side of the annular gap formed between the valve body 33 and the valve seat 28. A low pressure area within the bush 26 and a high pressure area near the lower surface of the valve body 33 are partitioned by the pressure partition wall portion 41. The other structures are the same as those of the embodiment 1 mentioned above.

In accordance with the present embodiment 2 described above, since the pressure partition wall portion 41 partitioning the low pressure area within the bush 26 and the high pressure area near the lower surface of the valve body 33 is fitted to the upper end opening portion of the bush 26, an application of the pressure pulsation to the valve body 33 is shut off by the pressure partition wall portion 41 even if the positive pressure area due to the collision of the fuel or the negative pressure area due to the peel-off of the flow is generated within the bush 26 (the low pressure area). Accordingly, the phenomenon that the valve body 33 and the diaphragm 30 vibrate is restricted, and it is possible to reduce the noise due to the resonance of the spring 34 introduced by the vibration transmission and the noise due to the resonance of the fuel pipe and the fuel tank.

Further, in accordance with the present embodiment 2, since the inflow hole 42 formed in the pressure partition wall portion 41 is formed in a shape for flowing the fuel within the low pressure area (within the pressure partition wall portion 41) in a swirling manner, it is possible to reduce the peel-off of the flow of the fuel near the inner peripheral surface of the bush 26 (near the inner peripheral surface of the pressure partition wall portion 41) by swirling the fuel within the bush 26 while preventing the collision of the flow of the fuel within the bush 26 (within the pressure partition wall portion 41) so as to prevent the positive pressure area from being generated, and it is possible to further increase the noise reduction effect.

In this case, in accordance with the present embodiment 2, each of the inflow holes 42 is formed so as to be inclined at the predetermined angle with respect to the inner diameter direction of the pressure partition wall portion 41, however, in order to make it simple to work each of the inflow holes 42, each of the inflow holes 42 may be formed in the inner diameter direction of the pressure partition wall portion 41. In accordance with this structure, the flow of the fuel flowing within the pressure partition wall portion 41 from each of the inflow holes 42 collides with the center portion within the pressure partition wall portion 41, however, since the inner portion of the bush 26 and the high pressure area near the lower surface of the valve body 33 are partitioned by the pressure partition wall portion 41, the application of the pressure pulsation generated due to the collision of the fuel within the pressure partition wall portion 41 to the valve body 33 is shut off by the pressure partition wall portion 41, and the noise is reduced.

In accordance with the present embodiment 2, the structure is made such that the pressure partition wall portion 41 and the bush 26 are separately formed so as to fit the pressure partition wall portion 41 to the upper end opening portion of the bush 26, however, the portion corresponding to the pressure partition wall portion 41 may be integrally formed with the upper end portion of the bush 26.

In addition, the fuel pressure regulating valve in accordance with the present invention is not limited to the structures in accordance with the embodiments 1 and 2, and can be realized by applying the present invention to variously structured fuel pressure regulating valves each provided with a bush and a valve body.

<Embodiment 3>

Figures 9, 10:
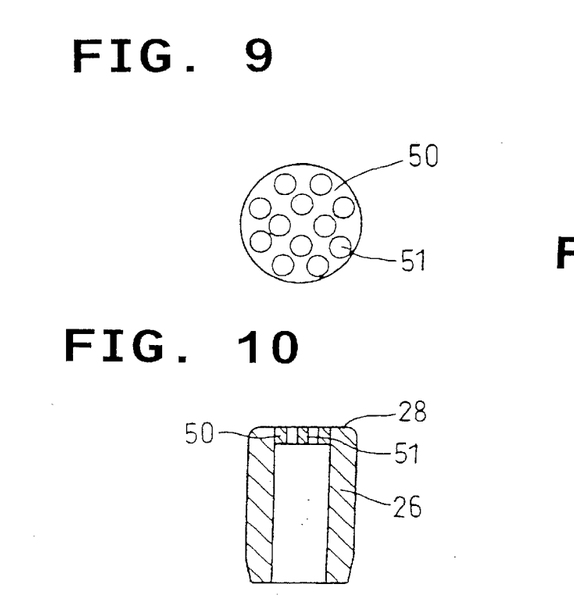
FIG. 9 is an enlarged front elevational view of a pressure uniformizing partition wall portion in accordance with the embodiment 3.
FIG. 10 is an enlarged vertical cross sectional view of a portion near a bush in accordance with an embodiment 4 of the present invention.

Next, a description will be given of an embodiment 3 in accordance with the present invention with reference to FIGS. 3 and 9. In accordance with the embodiment 3, in place of the pressure partition wall portion 41 in the embodiment 2, a pressure uniformizing partition wall portion 50 is fitted to an upper portion in an inner peripheral side of the bush 26. As illustrated in FIG. 8 and also FIGS. 10–16, discussed below, each of holes 51 is straight from upstream end to downstream end and has a substantially constant inner diameter from upstream to downstream ends thereof. The other structures are the same as those of the embodiment 2.

The pressure uniformizing partition wall portion 50 is formed in a tablet shape. Further, holes 51 extend through an upper end surface in an upstream side of the pressure uniformizing partition wall portion 50 and a lower end surface in a lower stream side thereof. Totally twelve holes 51 are arranged in a dispersed manner so as to form concentric double circles as shown in FIG. 9. Further, the holes 51 extend through the upper end surface and the lower end surface of the pressure uniformizing partition wall portion 50 in parallel to the axial direction of the bush 26. In this case, the upper end surface of the pressure uniformizing partition wall portion 50 is arranged immediately below the valve seat 28.

In accordance with the present embodiment 3, the pressure uniformizing partition wall portion 50 provided with the holes 51 is fitted to the upper portion in the inner peripheral side of the bush 26. Accordingly, even when the collision of the fuel is generated in the upstream side of the pressure uniformizing partition wall portion 50 and the pressure distribution becomes uneven, it is possible to divide the fuel by twelve holes 51. Further, in accordance with this flow division, it is possible to uniformize the pressure distribution of the fuel again combined in the downstream side of the pressure uniformizing partition wall portion 50. Further, due to a throttle loss of the holes 51, it is possible to reduce the flow speed of the fuel.

Further, in accordance with the present embodiment 3, since the upper end surface of the pressure uniformizing partition wall portion 50 is arranged immediately below the valve seat 28, a severe dimensional accuracy is not required even in the pressure uniformizing partition wall portion 50. Further, since the fuel throttled by the gap between the valve body 33 and the valve seat 28 flows into the holes 51 with hardly expanding, it is possible to restrict an oscillation of the diaphragm 30. Further, since the pressure of the fuel is uniformized in the downstream side of the pressure uniformizing partition wall portion 50, it is hard that the negative pressure area appears. Accordingly, it is possible to effectively restrict the noise generated by a pressure reduction boiling.

In this case, in accordance with the present embodiment 3, the pressure uniformizing partition wall portion 50 having the holes 51 is manufactured in accordance with a press molding, and is thereafter fitted to the upper portion in the inner peripheral side of the bush 26. However, the holes 51 may be pierced after manufacturing the pressure uniformizing partition wall portion 50. Further, the portion corresponding to the pressure uniformizing partition wall portion 50 may be integrally formed in the upper portion in the inner peripheral side of the bush 26.

<Embodiment 4>

Next, a description will be given of an embodiment 4 in accordance with the present invention with reference to FIG. 10. FIG. 10 is an enlarged vertical cross sectional view of a portion near the bush 26 in a fuel pressure regulating valve in accordance with the present embodiment 4. The present embodiment 4 is structured such that the pressure uniformizing partition wall portion 50 in the embodiment 3 is fitted so as to be flush with the valve seat of the bush 26. The other structures are the same as those of the embodiment 3.

In accordance with the present embodiment 4, the severe dimensional accuracy is required even in the pressure uniformizing partition wall portion 50 as mentioned above. However, the gap between the valve body 33 and the valve seat 28 and the hole 51 are continuous. Accordingly, the fuel throttled by the gap between the valve body 33 and the valve seat 28 flows into the holes 51 as it is. Therefore, it is possible to more effectively restrict the oscillation of the diaphragm 30. Further, in the case of manufacturing the pressure uniformizing partition wall portion 50 as being independent from the bush 26, it is possible to determine the fitting position of the pressure uniformizing partition wall portion 50 on the basis of the valve seat 28. In this case, there is an advantage that it is easy to position the pressure uniformizing partition wall portion 50.

In this case, in the present embodiment 4, the pressure uniformizing partition wall portion 50 is formed in the tablet shape, however, may be formed in a double disc shape comprising concentric large diameter portion and small diameter portion, that is, a pan lid shape, in addition to the tablet shape. Further, only the small diameter portion may be pressure fitted to the opening portion of the bush 26 and an upper end surface of the large diameter portion may be set as the valve seat. In accordance with this structure, it is unnecessary to make the valve seat 28 and the pressure uniformizing partition wall portion 50 flush. Further, since the lower end surface of the large diameter portion is brought into contact with the upper end surface of the bush 26 in the fuel flowing direction, there is no risk that the pressure uniformizing partition wall portion 50 is displaced due to the fuel pressure.

<Embodiment 5>

Figure 11:
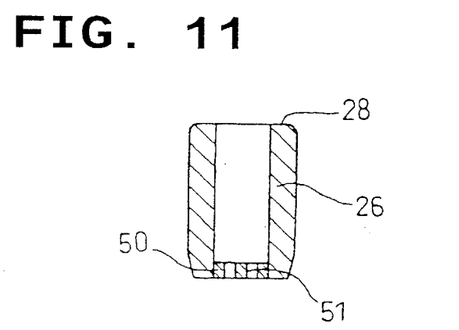
FIG. 11 is an enlarged vertical cross sectional view of a portion near a bush in accordance with an embodiment 5 of the present invention.

Next, a description will be given of an embodiment 5 in accordance with the present invention with reference to FIG. 11. FIG. 11 is an enlarged vertical cross sectional view of a portion near the bush 26 of a fuel pressure regulating valve in accordance with the present embodiment 5. The present embodiment 5 is structured such that the pressure uniformizing partition wall portion 50 in the embodiment 3 is fitted to the lower end surface of the bush 26 in a flush manner. The other structures are the same as those of the embodiment 3.

In accordance with the present embodiment 5, in the case of manufacturing the pressure uniformizing partition wall portion 50 independent from the bush 26, it is possible to determine the fitting position of the pressure uniformizing partition wall portion 50 on the basis of the valve seat 28. Accordingly, it is easy to position. Further, the severe dimensional accuracy as in the valve seat 28 arranged on the upper end surface is not required to the lower end surface of the bush 26. Accordingly, a dimensional freedom of the pressure uniformizing partition wall portion 50 is improved.

<Embodiment 6>

Figure 12:
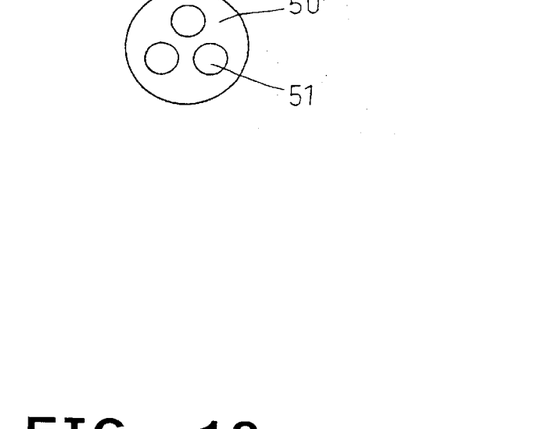
FIG. 12 is an enlarged front elevational view of a pressure uniformizing partition wall portion in accordance with an embodiment 6 of the present invention.

Next, a description will be given of an embodiment 6 in accordance with the present invention with reference to FIG. 12. FIG. 12 is an enlarged front elevational view of a pressure uniformizing partition wall portion 50 of a fuel pressure regulating valve in accordance with the present embodiment 6. The present embodiment 6 is structured such that the diameter of the holes 51 of the pressure uniformizing partition wall portion 50 in accordance with the embodiment 3 is increased, and the number of the holes 51 is set to totally three. The other structures are the same as those of the embodiment 3.

In accordance with the present embodiment 6, since the number of the holes 51 is reduced and the interval between the holes 51 is wide, it is possible to easily manufacture the pressure uniformizing partition wall portion 50.

In this case, even in the present embodiment 6, as in the embodiment 4 and the embodiment 5 mentioned above, it is possible to adjust the axial position of the pressure uniformizing partition wall portion 50.

In addition, the fuel pressure regulating valve in accordance with the present invention is not limited to the structures of the embodiments mentioned above, and can be realized by applying the present invention to various kinds of fuel pressure regulating valves each provided with a bush and a valve body.

<Embodiment 7>

Figure 13:
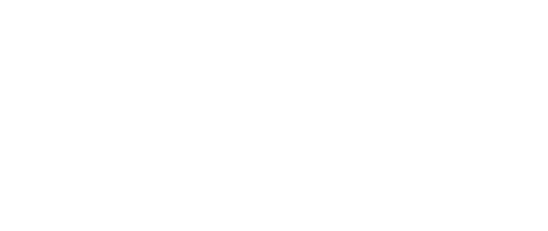
FIG. 13 is an enlarged vertical cross sectional view of a portion near a bush in accordance with an embodiment 7 of the present invention.

Next, a description will be given of an embodiment 7 in accordance with the present invention with reference to FIG. 13. FIG. 13 is an enlarged vertical cross sectional view of a portion near the bush of a fuel pressure regulating valve in accordance with the present embodiment 7. The present embodiment 7 is structured such that a mounting height of an upstream side end surface of the pressure uniformizing partition wall portion 50 in the embodiment 3, that is, an axial position 52 is set to a position 0.4 mm downward apart from the valve seat 28 in the axial direction. The other structures are the same as those of the embodiment 3.

In accordance with the embodiment 7, even when a foreign matter stays on the upstream side end surface of the pressure uniformizing partition wall portion 50, there is a small risk that the foreign matter is in contact with the valve body 33 at a time of closing the valve. Further, since the fuel flowing down from the valve seat 28 flows into the hole 51 before expansion, there is a small risk that the pulsation is generated due to the throttle resistance of the hole 51. Further, since it is hard that the negative pressure area appears in the downstream side of the pressure uniformizing partition wall portion 50, there is a small risk that the pulsation is generated due to the pressure reduction boiling.

<Embodiments 8 to 10>

Figure 14:
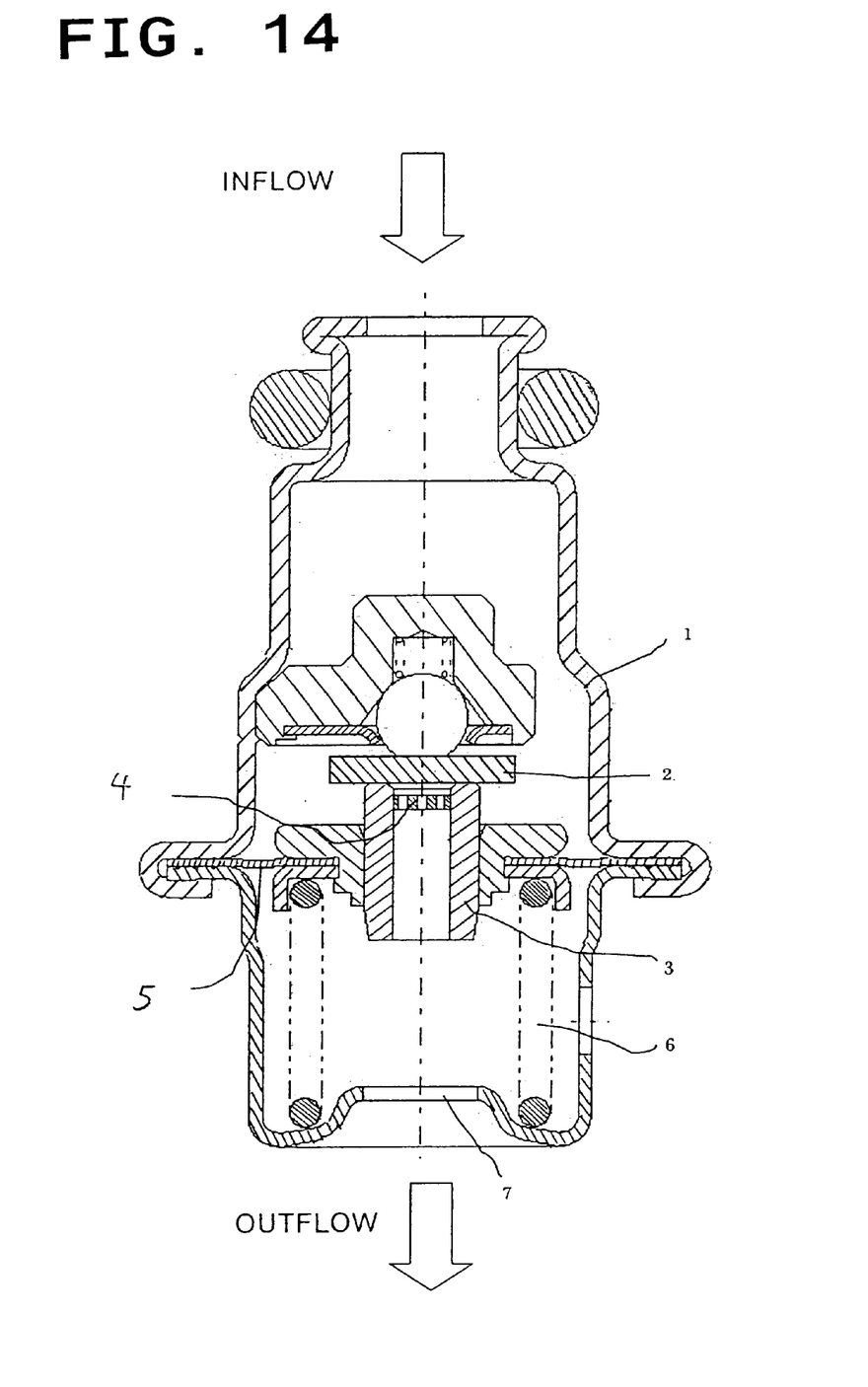
FIG. 14 is an enlarged vertical cross sectional view of a main portion of the embodiment 8.
Figure 15:
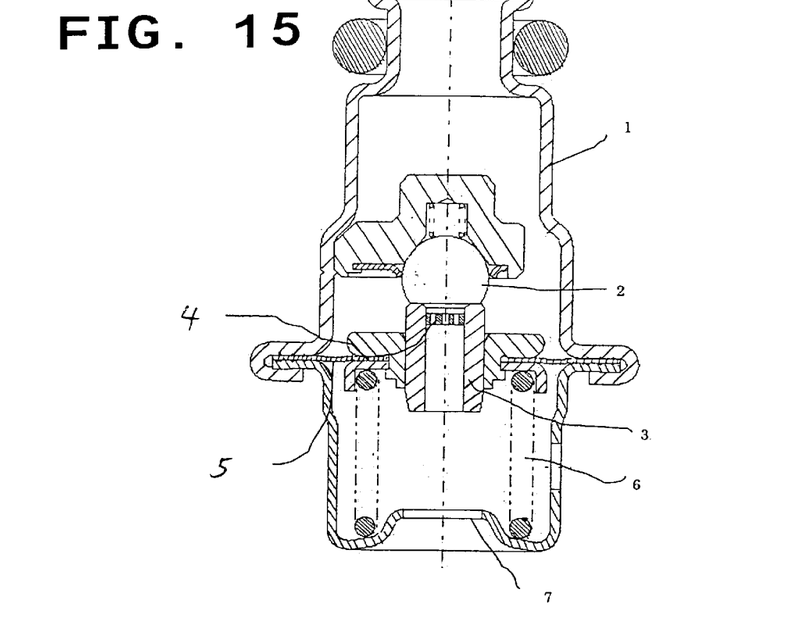
FIG. 15 is an enlarged vertical cross sectional view of a main portion of the embodiment 9.
Figure 16:
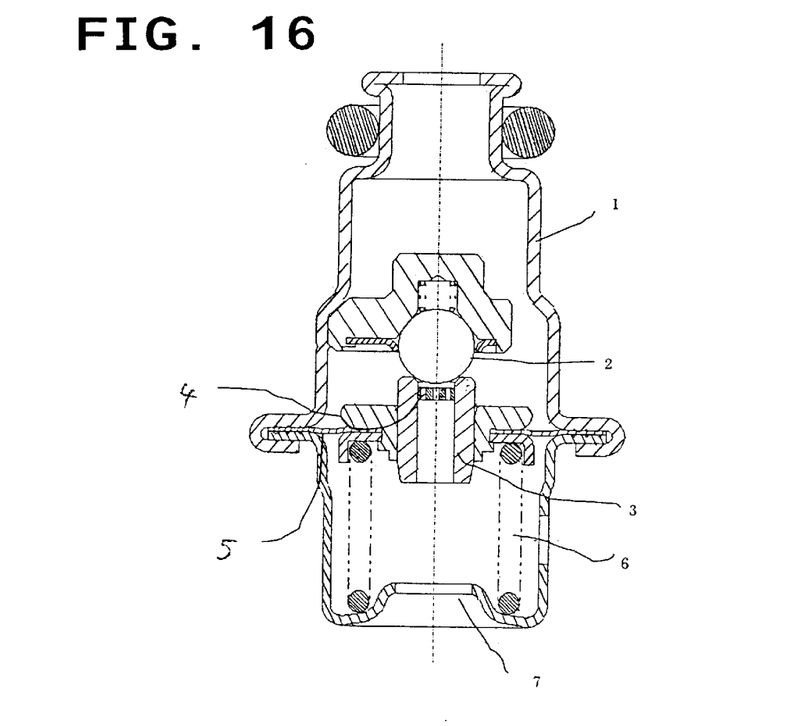
FIG. 16 is an enlarged vertical cross sectional view of a main portion of the embodiment 10.

FIGS. 14 to 16 show embodiments 8 to 10 in accordance with the present invention. All of them correspond to a fuel pressure control valve generally called as a 1-way type, and are structured such that an inflow fuel flows in one direction so as to be discharged.

FIG. 14 is a view showing an embodiment 8. In this embodiment 8, a communication hole is axially formed in a part of a peripheral direction of the valve seat. The structure is made such that the fuel passing through the hole presses a diaphragm, whereby a bush 3 corresponding to a valve body integrally formed with the diaphragm moves apart from a plate-like flat valve 2 (the valve seat body), the fuel flowing through a space therebetween further flows through a hole formed in the pressure uniformizing partition wall portion, and the fuel flows out to the external portion through a space in which a spring 6 is provided. In this embodiment, in the same manner as the embodiment 3, it is possible to uniformize a pressure distribution of the fuel which is again combined in the downstream side of the pressure uniformizing partition wall portion, the negative pressure area is hard to appear, and it is possible to restrict an expansion of a bubble cell nucleus due to the pressure reduction boiling.

FIG. 15 is a view showing an embodiment 9. In this embodiment 9, a valve seat is formed in a flat surface of a valve seat body 2 obtained by notching a part of a ball. Since the other structures are the same as those of the embodiment 8, a description thereof will be omitted.

FIG. 16 is a view showing an embodiment 10. In this embodiment 10, a valve seat is formed in the valve seat body 2 corresponding to the ball. Since the other structures are the same as those of the embodiment 8, a description thereof will be omitted.

The description is given above of the embodiments in accordance with the present invention. However, the fuel pressure regulating valve in accordance with the present invention is not limited to the structures of the embodiments mentioned above, and can be realized by applying to various kinds of fuel pressure regulating valves each provided with a bush and a valve body.

As is clear from the above description, according to the present invention it is possible to provide a fuel pressure regulating valve which is capable of effectively reducing the noise irrespective of the fuel flow rate.

What is claimed is:

1. A fuel pressure regulating valve having:

a housing;

a fuel chamber into which a fuel flows;

a spring chamber receiving a spring;

the fuel chamber and the spring chamber being formed within the housing by a partitioning diaphragm;

a tubular bush through which fuel flows out of said fuel chamber; and a valve body mounted to said diaphragm, said valve body being opposed to a valve seat formed in a peripheral edge of an opening portion of said bush;

said valve body being energized in a direction of said valve seat by said spring, said bush being provided with a pressure uniformizing partition wall portion having flow passages or holes for communicating said fuel chamber with an external portion, said flow passages or holes extending through both axial end surfaces in an axial direction for uniformizing a pressure distribution of the fuel in the downstream side, each of said passages or holes being straight from upstream end to downstream end thereof.

2. A fuel pressure regulating valve as claimed in claim 1, characterized in that said pressure uniformizing partition wall portion is arranged apart from said valve seat in the axial direction.

3. A fuel pressure regulating valve as claimed in claim 2, characterized in that said pressure uniformizing partition wall portion is arranged immediately below said valve seat in the axial direction.

4. A fuel pressure regulating valve having:

a housing;

a fuel chamber into which a fuel flows;

a spring chamber receiving a spring;

the fuel chamber and the spring chamber being formed within the housing by a partitioning diaphragm;

a tubular bush through which fuel flows out of said fuel chamber; and a valve body mounted to said diaphragm, said valve body being opposed to a valve seat formed in a peripheral edge of an opening portion of said bush;

said valve body being energized in a direction of said valve seat by said spring, said bush being provided with a pressure uniformizing partition wall portion having flow passages or holes for communication said fuel chamber with an external portion, said pressure uniformizing partition wall portion being provided with a plurality of said flow passages or holes extending through both axial end surfaces in an axial direction for uniformizing a pressure distribution of the fuel in the downstream side, said pressure uniformizing partition wall portion being arranged immediately below said valve seat in the axial direction, said pressure uniformizing partition wall portion being arranged so that an end surface in an upstream side in an axial direction is spaced from said valve seat to a downstream side in the axial direction at an amount equal to or more than 0.1 mm and less than 0.7 mm.

5. The fuel pressure regulating valve as claimed in claim 1, wherein each of said flow passages or holes has a substantially constant inner diameter from upstream end to downstream end thereof.

6. A fuel pressure regulating valve having:

a housing;

a fuel chamber into which a fuel flows;

a spring chamber receiving a spring;

the fuel chamber and the spring chamber being formed within the housing by a partitioning diaphragm;

a tubular bush through which fuel flows out of said fuel chamber; and a valve body mounted to said diaphragm, said valve body being opposed to a valve seat formed in a peripheral edge of an opening portion of said bush;

said valve body being energized in a direction of said valve seat by said spring, said bush being provided with a pressure uniformizing partition wall portion having flow passages or holes for communicating said fuel chamber with an external portion, said pressure uniformizing partition wall portion being spaced from said valve seat in the axial direction.

* * * * *